United States Patent [19]  [11] Patent Number: 4,959,836
Berard et al.  [45] Date of Patent: Sep. 25, 1990

[54] REGISTER ROBUSTNESS IMPROVEMENT CIRCUIT AND METHOD

[75] Inventors: Paul M. Berard; Ajaib S. Bhadare, both of Phoenix, Ariz.

[73] Assignee: Siemens Transmission Systems, Inc., Phoenix, Ariz.

[21] Appl. No.: 130,850

[22] Filed: Dec. 9, 1987

[51] Int. Cl.⁵ ............................................. G06F 11/08
[52] U.S. Cl. ................................................. 371/69.1
[58] Field of Search ...................... 371/69, 70, 31, 69.1

[56] References Cited

U.S. PATENT DOCUMENTS

| 3,427,585 | 2/1969 | Milford | 371/70 |
| 3,562,708 | 2/1971 | Verbarg et al. | 371/69.1 |
| 3,624,603 | 11/1971 | Delcomyn | 371/70 |
| 3,732,541 | 5/1973 | Neubauer | 371/69 |
| 3,781,792 | 12/1973 | Birkin | 371/69 |
| 3,800,286 | 3/1974 | Brown et al. | 340/172.5 |
| 3,863,215 | 1/1975 | McGrogan, Jr. | 371/69.1 |
| 3,876,980 | 4/1975 | Haemmig et al. | 371/69 |
| 3,883,891 | 5/1975 | Thompson et al. | 360/47 |
| 4,042,923 | 8/1977 | Merrick | 371/31 |
| 4,130,241 | 12/1978 | Meredith et al. | 235/307 |
| 4,133,504 | 1/1979 | Dobler et al. | 371/69 |
| 4,245,212 | 1/1981 | Cirimele | 371/69 |
| 4,344,180 | 8/1982 | Cummiskey | 371/69.1 |
| 4,360,918 | 11/1982 | Ruhnau et al. | 371/69 |
| 4,453,215 | 6/1984 | Reid | 364/200 |
| 4,456,997 | 6/1984 | Spitza | 371/68 |
| 4,737,957 | 4/1988 | Nohmi et al. | 371/69 |

FOREIGN PATENT DOCUMENTS

| 0006328 | 1/1980 | European Pat. Off. . |
| 0037362 | 10/1981 | |
| 0096113 | 12/1983 | |
| 0105755 | 4/1984 | European Pat. Off. . |
| 0149049 | 7/1985 | European Pat. Off. . |
| 0156388 | 10/1985 | European Pat. Off. . |
| 0165734 | 12/1985 | European Pat. Off. . |
| 98576 | 6/1973 | Fed. Rep. of Germany . |
| 2347317 | 4/1975 | Fed. Rep. of Germany . |
| 2609107 | 9/1977 | Fed. Rep. of Germany . |
| 159681 | 3/1983 | Fed. Rep. of Germany . |
| 3431304 | 3/1986 | Fed. Rep. of Germany . |
| 57-152037 | 9/1982 | Japan . |
| 593214 | 2/1978 | U.S.S.R. . |
| 647694 | 7/1979 | U.S.S.R. . |
| 676984 | 7/1979 | U.S.S.R. . |
| 1284506 | 8/1972 | United Kingdom . |
| 8700316 | 1/1987 | World Int. Prop. O. . |

OTHER PUBLICATIONS

Research Disclosure 26134, Jan. 1986, "Buffer Memory with Detection of Data Errors and Errors Caused by Faults in the Read and Write Address Registers".

Primary Examiner—Charles E. Atkinson
Attorney, Agent, or Firm—Jeffrey P. Morris

[57] ABSTRACT

The present invention describes a robust register circuit for protecting critical control points in data transmission and telecommunications equipment against software included failures. A circuit is provided wherein duplicated data words are written into a pair of registers of any desired bit length. A digital comparator determines whether the two data words are the same, and initiates a data transfer into a third register for transmission to critical hardware control points only when two identical sequential data words are recognized. When no such recognition occurs, new data is not transferred to the third register, and the hardware control points remain controlled by the previous data in the third register.

2 Claims, 4 Drawing Sheets

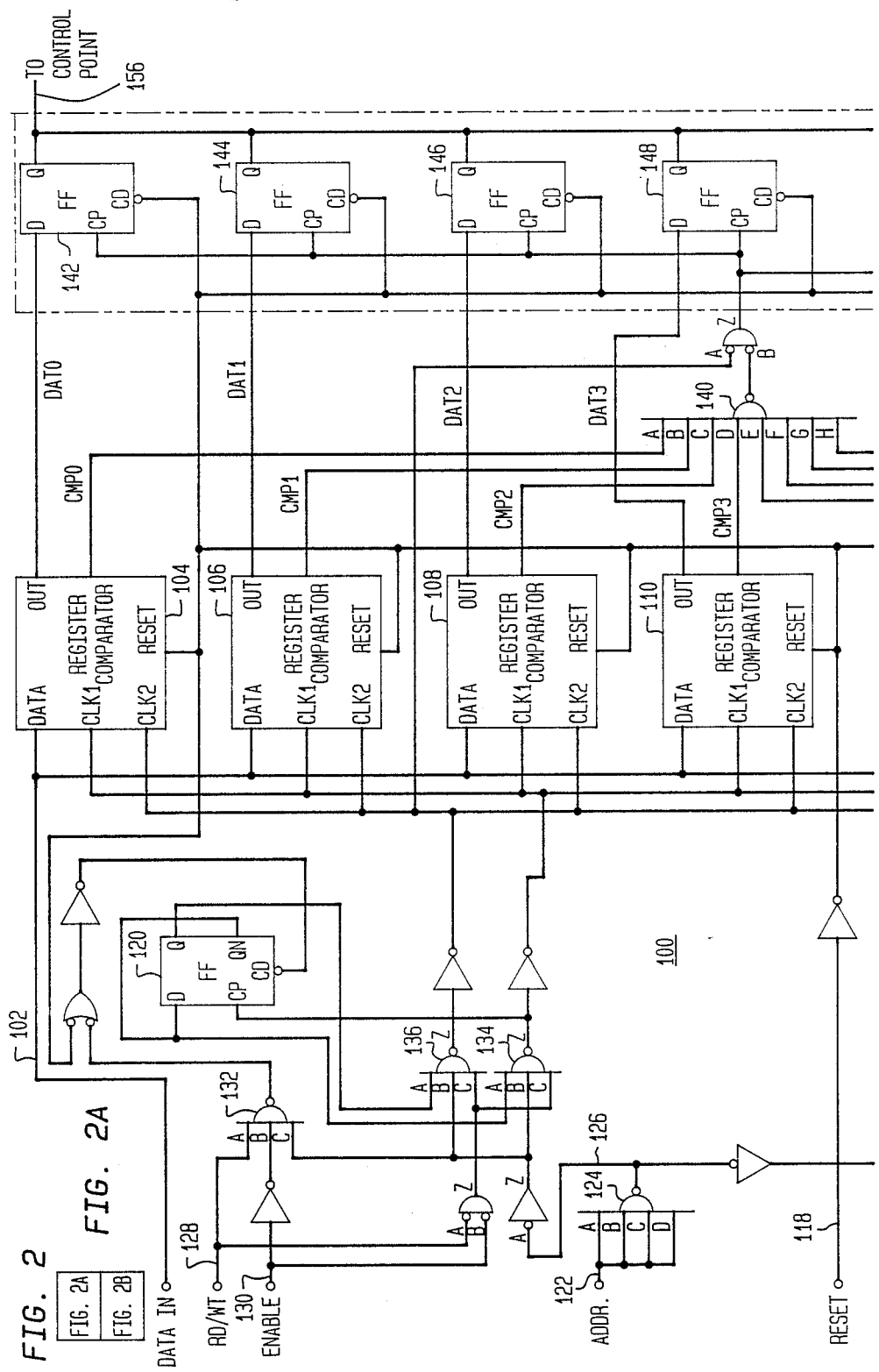

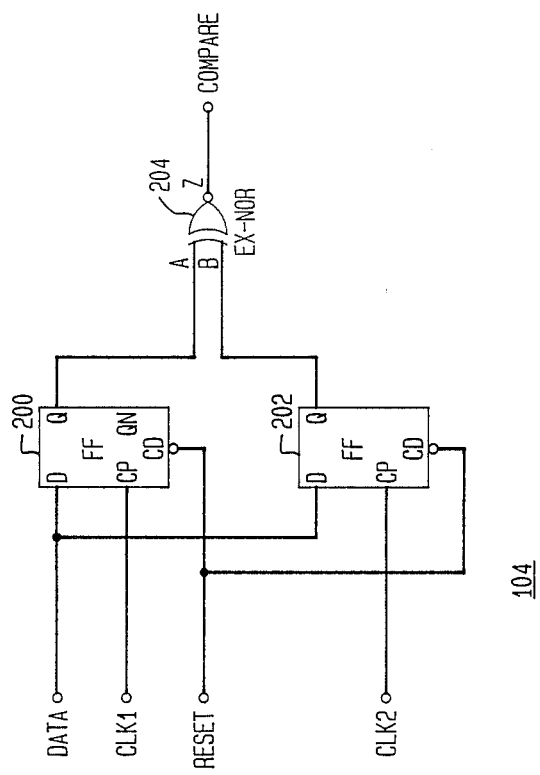

4,959,836

REGISTER ROBUSTNESS IMPROVEMENT CIRCUIT AND METHOD

BACKGROUND OF THE INVENTION

1. Field of the Invention

The present invention relates generally to the field of data transmission, and specifically to circuitry for protecting hardware and critical data control circuits from the consequences of a data control failure, resulting from software or firmware failures. The present invention also relates to a data register robustness circuit.

2. Description of the Prior Art

In existing telecommunications transmission equipment, including digital multiplexers and fiber optic terminals, critical circuit control points provide data traffic path switching and control, all under the direction of software instructions, which may be stored in integrated circuit ROM and EPROM or other memories. In the event of a software control failure error condition, the potential for losing telecommunication traffic is great, hence it is a current practice in the telecommunications industry to duplicate much of the critical hardware, and to substitute spare circuitry for failed circuitry in the event of a hardware fault, thereby maintaining the traffic. Certain of the hardware control functions are directed by and are under the control of software as mentioned before, and errors in this software can cause the hardware to malfunction, since such hardware contains control points that are accessed by the software by simple read and write instructions. When the software fails so as to accidentally write to one or more control points, or to couple erroneous data to such control points, traffic can be lost.

The present invention provides a circuit which is interposed between the control points and the control software to detect the aforementioned erroneous control transmissions and to ensure that only accurate control data is coupled to the control points. In accordance with the present invention, a circuit is described which requires the control software to write the same data to a control point register twice in immediate sequence before the intended action can occur. Since the typical failure mode of control software is to start reading and writing random data to random locations, the present invention provides substantially improved robustness and protection against almost all normal software failures, since under such failure conditions, the same data would not be written to the same location two times in immediate sequence.

The known prior art includes various redundant signal processors which require duplication of hardware or complex and costly circuit arrangements, in contradistinction to the present invention. Examples of such prior art techniques are U.S. Pat. No. 3,883,891, titled redundant signal processing error reduction technique; U.S. Pat. No. 4,344,180 titled redundant word frame sunchronization circuit; U.S. Pat. No. 4,453,215 titled central processing apparatus for fault-tolerant computing; U.S. Pat. No. 3,800,286 titled address development techniques utilizing a content addressable memory; U.S. Pat. No. 4,130,241 titled control systems; and U.S. Pat. No. 4,456,997 titled facility for fail-safe data transmission between trackside equipment. None of the aforementioned prior art patents provide for the simplified technique of duplication of data and bit-by-bit comparison of the duplicated data in a robust register circuit, which overcomes the complexity and cost of the prior art, while protecting critical control points against software failures, as provided by the present invention.

It is therefore an object of the invention to provide a protective circuit and method to protect critical hardware control points in data transmission and in telecommunications equipment against software failures.

It is a further object of the invention to provide a robust register circuit and method for protection against loss of telecommunications traffic.

A further object of the invention is to provide a robust register circuit and method which requires that control data must be written twice in a row before it is recognized as valid data and coupled to a critical control point.

SUMMARY OF THE INVENTION

The present invention describes a robust register circuit for protecting critical control points in data transmission and telecommunications equipment against software induced failures. A circuit is provided wherein duplicated data words are written into a pair of registers of any desired bit length. A digital comparator determines whether the two data words are the same, and initiates a data transfer into a third register for transmission to critical hardware control points only when two identical sequential data words are recognized. When no such recognition occurs, new data is not transferred to the third register, and the hardware control points remain controlled by the previous data in the third register.

The invention as summarized hereinbefore together with the objects and advantages enumerated are accomplished in a specific embodiment, described in connection with the accompanying drawings, wherein:

BRIEF DESCRIPTION OF THE DRAWINGS

FIG. 3 is a circuit diagram of the register and comparator circuits described with reference to FIG. 2.

DESCRIPTION OF THE PREFERRED EMBODIMENT

Figure 1:
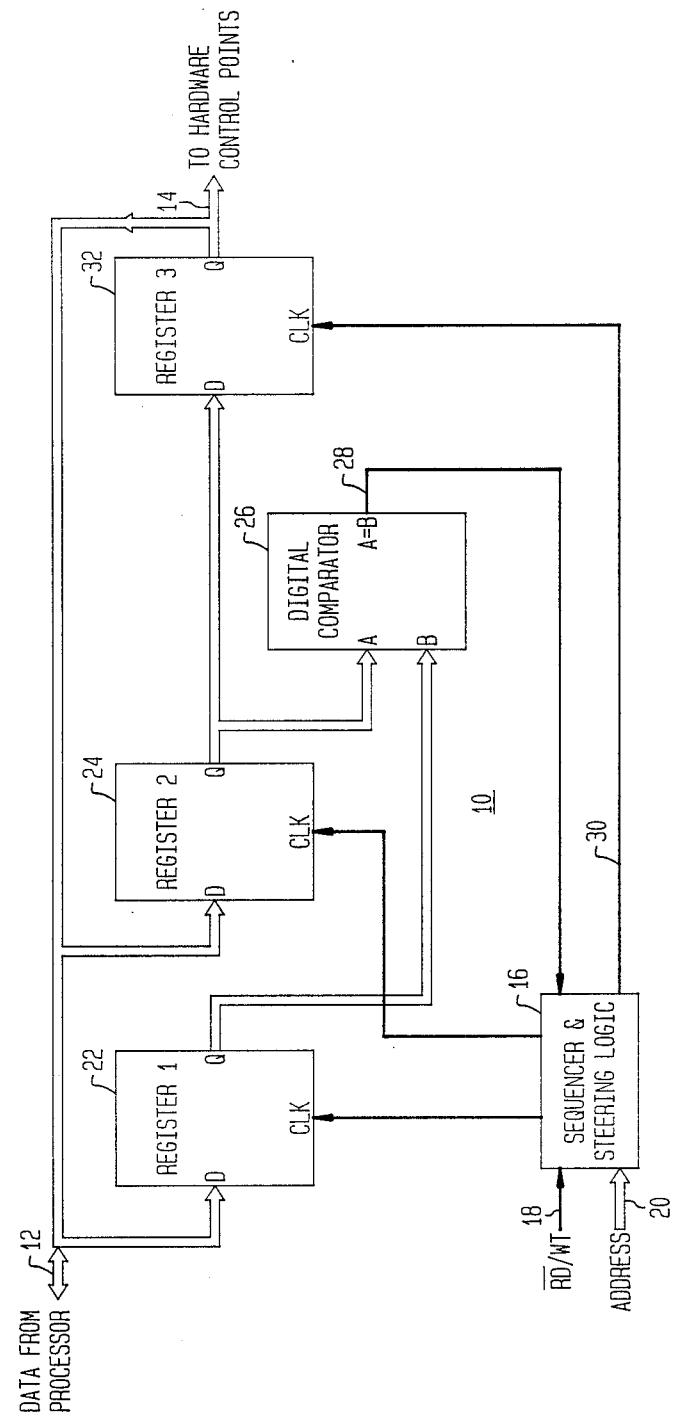
FIG. 1 is a block diagram of a register robustness circuit in accordance with the present invention.

Referring to FIG. 1, a block diagram of a circuit for protecting circuit control points, such as telecommunications traffic control points, protection switch relay control inputs, and any relatively static control points from erroneous data inputs is illustrated generally at 10. The data input to protection circuit 10 is shown at line 12, which is representative of any number of data bits from a processor under software control. Such processors are well known off-the-shelf microprocessors, for example, which contain programming stored in ROM. Such stored programming is in the form of instructions or addresses in memory, and may initiate multi-bit instruction or address data words onto line 12. In the embodiment described herein, 7-bit data words are operated upon, by way of example, however, any length data words may be accommodated. The data stored in a read-only-memory (ROM) or an electrically programmable read-only-memory (EPROM) is susceptable to electromagnetic interference, cosmic rays, electrical transients or heat; any one of which can cause a stored data bit to change state.

Such a change of state of a stored data bit can result in an erroneous instruction being read onto line 12 from ROM or EPROM, such as "go to RAM" instead of ROM, causing control software to try to execute data instead of code. The circuit 10 is located between the processor output on line 12 and the control point input 14, thereby, as will be explained hereinafter, preventing erroneous data from being coupled to critical control points. The circuit 10 functions to require that any data on line 12 must be transmitted in duplicate, such that identical data bit sequences must be recognized twice in a row, i.e. two identical 7-bit binary number sequences immediately following each other in direct sequence, with no other data bits in between. Only when the foregoing condition is met is data coupled out on line 14 to the critical control points. Since these control points are not changed very often, e.g. are relatively static, high data speed is not critical to the intended protective circuit operation. Such a control point is, for example, a Protection switch relay to switch telecommunications traffic from line one line card to another when a fault occurs in the line card. The doubling of the time for real time processing is no disadvantage in such applications.

Sequencer and steering logic circuit 16 receives READ and WRITE commands on line 18 from a processor (which does not form a part of the invention, and can consist of any known source of such instructions). The sequencer 16 must recognize the proper sequence of READS and WRITES to properly operate. Specifically, the instruction on line 18 must first READ, then WRITE, then WRITE again the same data on line 12 to the same register address on line 20. The READ input on line 18 resets the sequencer 16 so that it points to register 1, shown at 22. The WRITE instruction generates a waveform to clock the first data word from line 12 to register 1, and advances the sequencer 16 so that it points to register 2, shown at 24; the next WRITE instruction on line 18 clocks the second data word from line 12 into register 2. A digital comparator 26 compares the two data words from registers 1 and 2, and if they are identical e.g. A=B, generates an output on line 28 which causes the sequencer 16 to initiate a clock on line 30 which clocks register 3, shown at 32, which transfers the contents of register 2 into register 3. If the comparator 26 determines that the data words in registers 1 and 2 are different, the register 3 clock input on line 30 does not occur, and register 3 retains its old data. The output of register 3 is the control data that is coupled to and operates the critical hardware control points 14. If the second WRITE instruction on line 18 is to a different address than the first WRITE instruction, the register 3 clock also does not occur. Thus, register 3 cannot be updated unless the specific desired sequence (either software or hardware controlled) is met, and incorrect data is kept out of register 3.

Figure 2B:
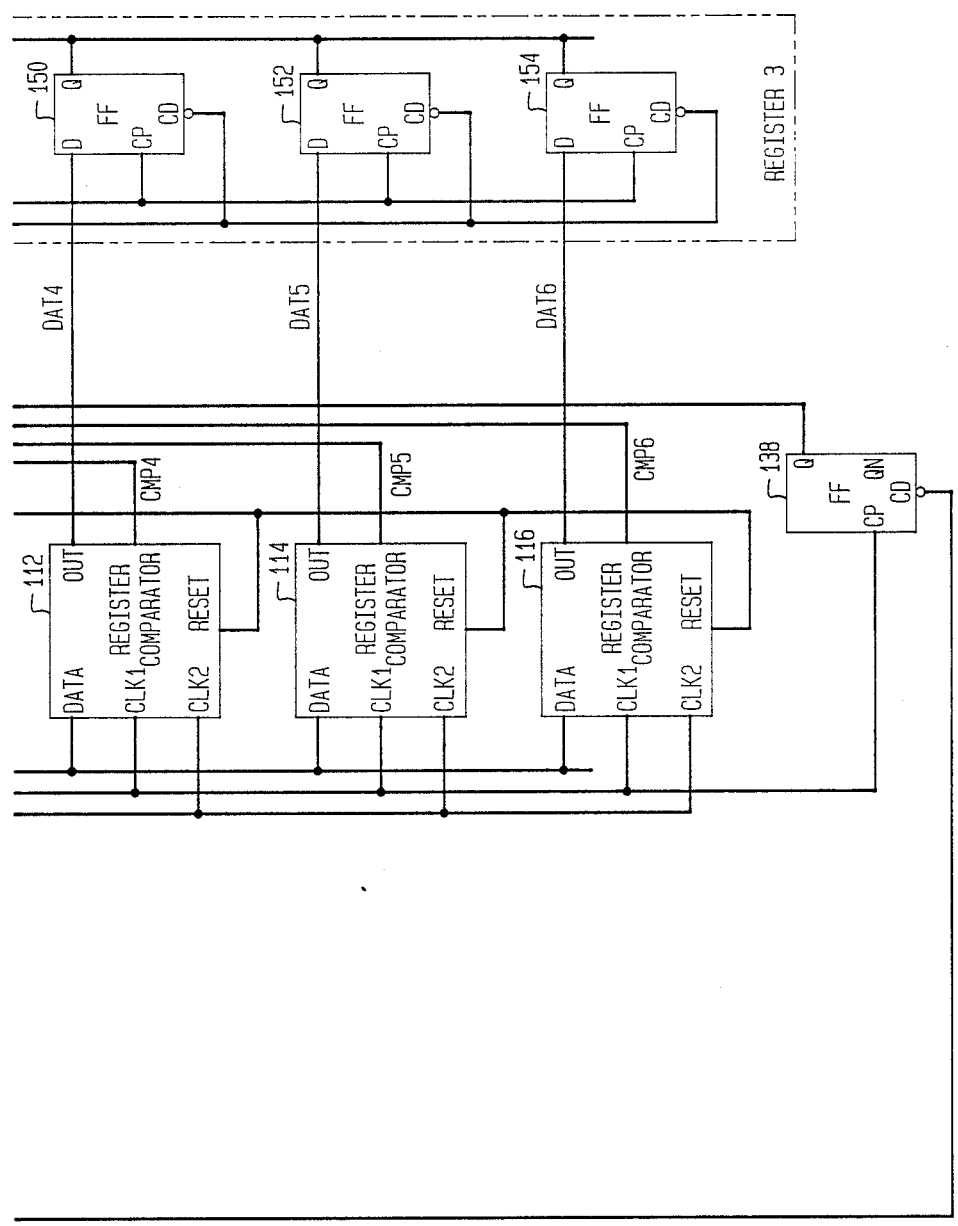
FIG. 2 comprised of FIGS. 2A and 2B is a more detailed block and schematic diagram of register robustness circuit of the present invention.

Referring to FIG. 2, a schematic diagram of the circuit of FIG. 1 is shown generally at 100. While this circuit can be implemented either in discrete or integrated circuit logic, the circuit shown is implemented in a gate array in CMOS in an LSI Logic 9000 series using a 1.2 micron process.

Seven bit data words are received on line 102 in the illustrated embodiment, hence a seven bit register configuration is illustrated, however, any size register can be configured to accommodate any desired bit length data word input. Each of the register/comparator circuits 104, 106, 108, 110, 112, 114 and 116 includes a single bit circuit incorporating registers 1 and 2 and comparator 26 of FIG. 1. The seven register/comparator circuits 104-116 taken together implement registers 1, 2 and comparator 26 of FIG. 1. The seven register/comparator circuits 104-116 taken together implement registers 1, 2 and comparator 26 of FIG. 1 in their entirety. FIG. 3 illustrates the circuit details for handling a single bit of registers 1, 2 and comparator 26, and corresponds to any one of the circuits 104 through 116, in detail.

An asynchronous reset signal RESET on line 118 is applied during initialization, and clears all registers and resets the pointer flip-flop 120 in the sequencer and steering logic circuit 16. The register address on line 122 is decoded by a four input NAND gate 124 to derive an active-low signal on line 126, which is applied whenever the register is being addressed by control software on line 20. In this illustrative example, an all-1s address is being decoded, however the address decoder can be arranged to decode any N-bit code. Any read cycle to the addressed register is decoded from logic high from line 128, active low from line 126, and active low from line 130 by NAND gate 132, which resets the pointer flip-flop 120. A write cycle to the register is decoded from low on line 128, low on line 126 and active-low pulse on line 130 and appears at the input to NAND gates 134 and 136.

The sequencer 16 operation will now be described. The proper input sequence is READ, WRITE, WRITE. The first READ operation assures that the pointer flip-flop 120 is reset. This enables NAND gate 134, which allows the enable pulse on line 130 during the first WRITE cycle to clock the data from the DATA IN bus 102 into the first register 104 of the register/comparators 104-116. The foregoing operation also sets flip-flop 138. Also during the WRITE cycle, the pointer flip-flop 120 is set, which enables NAND gate 136, which allows the enable pulse during the next WRITE cycle to clock the data from line 102 into the register 2 (described with reference to FIG. 1) of each of the register/comparator circuits 104 through 116 of FIG. 2. Each bit of the two registers 1 and 2 contained in each of circuits 104 through 116 is compared with the other bit by the individual comparator 26 in each circuit 104 through 116, which comparator 26 is implemented for each bit to be compared by the exclusive-NOR gate 204 described with reference to FIG. 3.

FIG. 3 illustrates a register/comparator circuit 104, which comprises flip-flops 200 and 202 and exclusive-NOR gate 204. Exclusive-NOR gate 204 is one seventh of the digital comparator 26, flip-flop 200 corresponds to one seventh of register 2 and flip-flop 202 corresponds to one seventh of register 1. Circuits 106 through 116 are identical to circuit 104. The comparisons from each of the comparators in circuits 104 through 116 are logically ANDed by NAND gate 140. NAND gate 140 is enabled by flip-flop 138, which monitors the decoded register address from NAND gate 124 for activity. Any change on the address bus during the WRITE operations clears flip-flop 138, which in turn disables the comparators NAND gate 140, thereby preventing completion of the cycle.

Assuming that the comparison of the register 1 and 2 contents at comparator 26 is indicative of valid data, and there has been no change of address, the rising edge of the enable pulse clocks register 2 data into register 3 (shown as 32 in FIG. 1), and comprising flip-flops 142, 144, 146, 148, 150, 152 and 154 as shown in FIG. 2. The output of register 3, e.g. the 7-bit output of registers 142 through 154, is coupled out to the critical hardware control points via line 156, which corresponds to line 14 in FIG. 1. While FIG. 2 is a simplified schematic, it is to be understood that there are actually four separate address leads at 122, there are seven separate data leads at 102—one to each register/comparator, and there are seven separate control point leads 156, one from each flip-flop.

While the present invention has been described in connection with a preferred embodiment thereof, additional embodiments will become apparent to those skilled in the art with reference to the present disclosure. For example, more robust registers can be implemented by increasing the number of comparison registers, which would also require increasing the size of the pointer register and the width of the exclusive-OR gate, with each additional register requiring an additional WRITE sequences by the control software. Accordingly, such additional embodiments, modifications and applications are included within the spirit and scope of the present invention as set forth by the claims appended thereto.

I claim:

1. A robust control circuit for coupling input data to system control points, comprising:
    a digital data input for receiving an input of two data words of N bits each following in sequence, and a data output for outputting a valid data word to system control points only if the two compared data words are identical;
    a plurality N of register/comparator circuits, each of which includes a first single-bit register element provided with a first single-bit data input, a first clock signal input, and a first single-bit data output, a second single-bit register element provided with a second single-bit data input, a second clock signal input, and a second single-bit data output, and a comparator element for comparing the first and second single-bit data outputs from said first and second register elements and providing a match signal output only if they are identical;
    sequencer means, including an input for a READ, a first WRITE, and a second WRITE command sequence, a WRITE enabling circuit for providing clock signals for clocking N bits of a first data word from said digital data input into the N first single-bit register elements of said n register/comparator circuits upon receipt of the first WRITE command by said sequencer means and for clocking N bits of a second data word following said first data word into the N second single-bit register elements of said N register/comparator circuits upon receipt of the second WRITE command, and a pointer element for providing a pointer signal to said WRITE enabling circuit for alternately writing said first and second single-bit register elements upon receipt of said first WRITE and said second WRITE commands, said pointer element being reset upon receipt of said READ command;
    a plurality of data transmission lines connecting the digital data input for said control circuit to each of the single-bit data inputs of said first and second single-bit register elements of said N register/comparator circuits, and first and second sets of clock signal lines, each set being respectively connected between said WRITE enabling circuit and the clock signal inputs of respective ones of said first and second single-bit register elements of said N register/comparator circuits;
    a gate element for receiving the outputs of said comparator elements of said N register/comparator circuits and for providing an output of a valid data signal only if match signal outputs are received from all comparator elements; and
    a third register circuit having input means connected to the single-bit data outputs of said second register elements of said N register/comparator circuits, an enable signal input connected to the output of said gate element, and output means forming said data output for said control circuit, said third register circuit being enabled to receive the N data output bits of said second register elements only if a valid data signal is provided to said enable signal input from said gate element,
    whereby said third register circuit receives and outputs a valid data word of said N data output bits only if the two data words input to said first and second register elements, respectively, of said register/comparator circuits are identical.

2. A robust control circuit according to claim 1, wherein said first and second single-bit register elements of said register/comparator circuits are first and second flip-flops, respectively, said comparator element is an exclusive-NOR gate, said gate element is a NAND gate, and said third register circuit is formed of N third flip-flops.

* * * * *